United States Patent

[11] 3,543,796

| [72] | Inventor | Stuart J. Durant<br>9575 Hillsdale Beaverton Highway,<br>Beaverton, Oregon 97005 |
|---|---|---|
| [21] | Appl. No. | 721,685 |
| [22] | Filed | April 16, 1968 |
| [45] | Patented | Dec. 1, 1970 |

[54] FLUID SELECTOR VALVE
5 Claims, 3 Drawing Figs.

[52] U.S. Cl. .................................................... 137/625.11;
251/262, 251/331
[51] Int. Cl. ................................................ F16k 11/00
[50] Field of Search .......................................... 137/625.11,
625.4, 625.17, 625.43; 251/(Ball Valve
Supplemental Operator), 331, 262

[56] References Cited
UNITED STATES PATENTS
2,752,948  7/1956  St. Clair ..................  137/625.4

| 2,812,154 | 1/1953 | Nordstrand .................. | 251/331X |
| 3,165,119 | 1/1965 | Hewitt .......................... | 137/625.43X |

FOREIGN PATENTS
511,989  1/1921  France .......................  137/625.4X

Primary Examiner—M. Cary Nelson
Assistant Examiner—R. B. Rothman
Attorney—Oliver D. Olson ABSTRACT: A hollow housing contains an annular, hollow, flexible manifold which communicates with a fluid outlet and a plurality of circumferentially spaced fluid inlets. Each inlet has a valve seat at its inner end. A valve-actuating ball associated with each inlet is located outside the manifold opposite each inlet seat and is movable by a central, rotatable cam between an unsealing position in which the seat-confronting portion of the manifold is spaced from the inlet seat and a sealing position in which said confronting portion abuts the seat and seals the inlet.

Stuart J. Durant
INVENTOR
BY Oliver D. Olson
Agent

FLUID SELECTOR VALVE

BACKGROUND OF THE INVENTION

The present invention relates to fluid valves, and more particularly to fluid selector valves of the type in which fluid is delivered from one or more inlets selectively to one or more outlets.

Prior selector valves of the class described generally provide a hollow housing which functions as a fluid reservoir in which a plurality of valves are associated with a plurality of outlets. Since the reservoir and valve mechanism are exposed to the fluid, such valves either have limited utility or the parts thereof must be made of materials capable of resisting the corrosive effects of a wide variety of fluids. Moreover, such arrangements involve a substantial number of parts, including a number of fluid seals, which correspondingly increases the costs of construction, assembly and maintenance.

SUMMARY OF THE INVENTION

In its basic concept, the present invention provides a fluid selector valve in which a flexible, noncorrosive manifold performs the dual function of a valve component and of isolating the fluid from all parts external of the manifold.

It is by virtue of the foregoing basic concept that the primary objective of the present invention is achieved, namely to overcome the disadvantages of prior fluid selector valves, as enumerated hereinbefore.

The foregoing and other objects and advantages of the present invention will appear from the following detailed description, taken in connection with the accompanying drawing of the preferred embodiment.

DESCRIPTION OF THE PREFERRED EMBODIMENT

Figure 1:
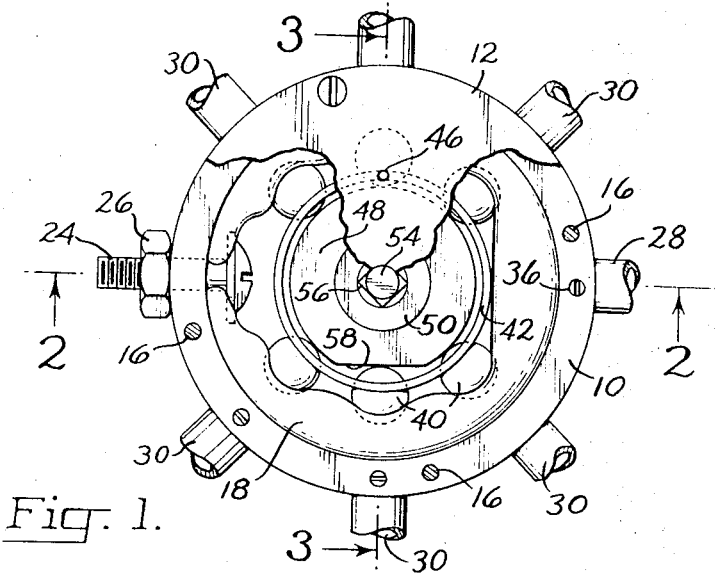
FIG. 1 is a fragmentary plan view of a fluid selector valve embodying features of the present invention, a portion of a cover plate being broken away to disclose details of internal construction.

The fluid selector valve illustrated in the drawing includes a main support in the form of a hollow housing provided by the cylindrical wall 10 and the opposite end covers 12 and 14 secured to said wall by such means as the screws 16.

Figure 2:
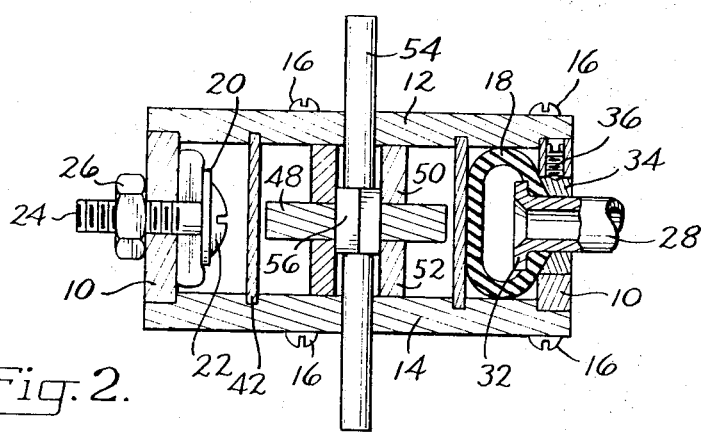
FIG. 2 is a fragmentary sectional view taken on the line 2–2 in FIG. 1.

A hollow manifold 18 is supported within the housing. In the embodiment illustrated the manifold comprises a length of flexible, fluid impervious tubing molded or bent to substantially annular shape and abutting the inner surface of the housing wall. The adjacent, open ends of the tubing are pinched closed by being clamped between the washer 20 behind the bolt head 22, and the sidewall 10 (FIG. 2). The shank 24 of the bolt extends outward through a radial opening in the sidewall 10. The threaded shank of the bolt receives the clamping nut 26 by which force is exerted to pinch closed the open ends of the manifold tubing.

It will be apparent that the annular manifold may be provided as a continuous, annular ring, as by sealing together the abutting opposite ends of a length of tubing. Difficulty of manufacture of such a closed ring makes the illustrated arrangement preferred.

The manifold may be made of any of a variety of flexible, fluid impervious materials of varying wall thickness. It preferably is made of natural or synthetic rubber, synthetic thermoplastic resin, or other material having elasticity as well as flexibility, for the purpose explained more fully hereinafter.

Figure 3:
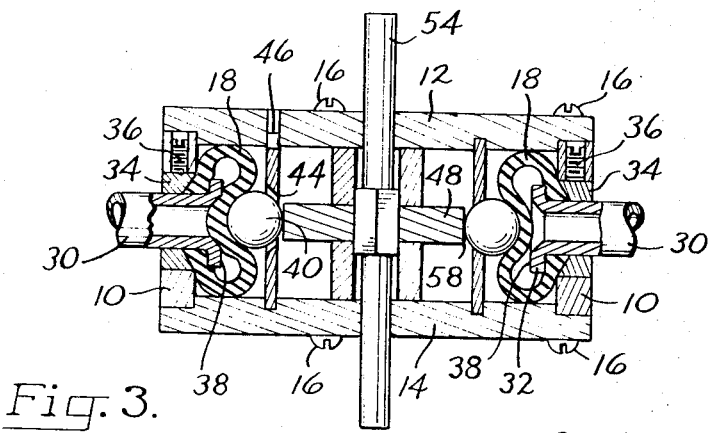
FIG. 3 is a fragmentary sectional view taken on the line 3–3 in FIG. 1.

In the embodiment illustrated the manifold is provided with a fluid outlet 28 and a plurality of fluid inlets 30, there being six fluid inlets illustrated. The fluid outlet and inlets are of substantially identical construction, as best illustrated in FIGS. 2 and 3. Thus, each comprises a length of tubing provided on its inner end with an enlarged shoulder 32. The tubing extends outward through an opening in the manifold 18, with the shoulder located inside the manifold. A clamping ring 34 is received over the tubing and drawn toward the shoulder, whereby to clamp the interposed portion of the manifold tightly therebetween to provide a fluid tight seal. The clamping ring is secured to the tubing by such means as interengaging threads, or by a press fit. The ring is secured in a radial opening in the sidewall 10 of the housing by such means as the set screws 36.

The shoulder 32 on each of the inlets also forms a valve seat 38 which faces a confronting portion of the opposite side of the manifold 18. Said confronting portion forms a valve, and means is provided for moving said valve seat and confronting portion relative one to the other for releasably sealing the associated inlet from the interior of the manifold. In the embodiment illustrated, a valve-actuating ball 40 is associated with each inlet and is disposed against the outer surface of the confronting portion of the manifold opposite the valve seat. The valve balls are retained in position by means of a hollow cylinder 42 provided with circumferentially spaced openings 44 (FIG. 3), each of which functions to confine one of the valve balls. The cylinder is supported between the end walls 12 and 14 of the housing, being retained in annular grooves therein, and is held against axial rotation by means of an interlocking pin 46 which is pressed into alined openings in the end wall 12 and cylinder.

Operating means is provided for moving the valve-actuating balls radially outward to press the interposed confronting portion of the manifold 18 against the associated inlet seats. Thus, a cam disc 48 is positioned within the cylinder 42 and is supported between the housing end walls by means of the hollow spacers 50 and 52. A control shaft 54 extends through openings in the end walls alined with the hollow spacers, and a noncircular section 56 of the shaft makes driving connection with a corresponding noncircular central opening in the dam disc.

In the embodiment illustrated the cam disc is provided with a peripheral flat segment 58 (FIG. 1) proportioned to register with one valve ball at a time. The remaining valve balls are urged outward by the disc, sealing the corresponding inlets from the manifold. It will be understood that the cam disc may be contoured to provide for opening more than one inlet at a time, while closing any remaining inlets.

The valve ball registering with the flattened segment of the cam disc is urged radially inward by the resilience of the manifold material and/or by pressure of fluid delivered to the manifold. In this regard the manifold preferably is made of resilient material, as previously mentioned, in order to minimize reliance upon fluid pressure to unseal the outlets.

It is to be noted that the selector valve of the present invention may be utilized for controlling the flow of a wide variety of fluids, merely by proper selection of the material for the manifold and for the inlet and outlet tubings, since it is only these components that come in contact with the fluid. No external fluid seals are required, and all other components of the housing and valve mechanism may be made of inexpensive materials.

The selector valve illustrated has particular utility for selectively connecting a plurality of beer kegs to a single tap. In this manner, as each keg is drained of its contents the valve functions to connect a full keg to the tap while maintaining all other kegs closed. For this purpose it will be understood that the manifold is made of food grade material.

The valve also may be utilized to deliver gas under pressure from a single inlet to one or more outlets, each connected to a beer keg or other device to be pressurized. In this case, the outlet illustrated becomes an inlet and the plurality of inlets become outlets.

In similar manner, the valve may be utilized to distribute water under pressure from a single inlet selectively to one or more outlets, each servicing a desired section of lawn or other area to be watered.

It will be apparent to those skilled in the art that various other changes may be made in the size, number, type and arrangement of parts described hereinbefore. For example, the valve may be provided with but a single inlet and outlet, or with any additional number of inlets and outlets desired. The annular manifold may be supported upon a flat plate, rather against the circular housing wall 10 illustrated, with the valve balls confined in openings in a flat plate overlying the manifold and with a cam member overlying the flat plate. In this case the cam member is provided with one or more indentations arranged to register with the valve balls to perform the unsealing function of the flat segment 58 illustrated.

Although the control shaft 54 may be secured in fixed position and the housing rotated relative to it, the reverse arrangement is preferred.

The valve may be constructed for rectilinear operation rather than for the rotational operation of the arrangement illustrated. In such case the manifold is provided as an elongated straight tube, sealed at its ends, the valve balls are retained in longitudinally spaced openings in a flat plate, and an operating cam is movable longitudinally for selective engagement with the valve balls.

The relative movement of the inlet seats 38 and the confronting portions of the manifold 18 may be achieved by moving the inlet tubings toward and away from said confronting portions. This may be achieved, for example, by utilizing the inlet tubings as armatures of electric solenoids mounted on the main support, or by appropriate manual levers interconnecting the inlet tubings and the main support. In such instance of movement of the inlet tubings, the valve balls may be omitted, since the shoulder seat is movable inwardly into sealing contact with the confronting portion of the manifold which would be supported by an imperforate cylinder 42 or plate.

The foregoing and many other changes may be made, as desired, without departing from the spirit of this invention.

I claim:

1. A fluid selector valve, comprising:
   a. a support;
   b. a hollow one-piece manifold member of flexible, fluid impervious material of annular cross section supported by the support;
   c. at least one fluid inlet member communicating at its inner end with the interior of the manifold member;
   d. at least one fluid outlet member communicating at its inner end with the interior of the manifold member;
   e. a valve seat on the inner end of at least one of the inlet and outlet members, the valve seat facing a confronting portion of the manifold member; and
   f. movable means on the support for moving the valve seat and seat-confronting portion of the manifold member relative one to the other for moving said confronting portion into and out of sealing engagement with the seat.

2. The fluid selector valve of claim 1 including a plurality of one of the inlet and outlet members each having a valve seat and wherein the movable means comprises:
   a. a plurality of valve-actuating members one associated with each valve seat;
   b. means supporting each valve-actuating member adjacent the outer side of the manifold member opposite its associated seat for movement toward and away from the latter, whereby the interposed confronting portion of the manifold member is sealed against and spaced from, respectively, the associated seat; and
   c. valve operator means mounted on the support for relative movement of said operator means and support, the operator means being arranged to engage the valve-actuating members selectively to move them toward seat-sealing position.

3. The fluid selector valve of claim 2 wherein the manifold member is of resilient material, whereby to urge the valve-actuating members away from seat-sealing position.

4. The fluid selector valve of claim 2 wherein the operator means is arranged to allow movement of each valve-actuating member selectively to seat-unsealing position while urging the remaining valve-actuating members to seat-sealing position.

5. The fluid selector valve of claim 2 wherein:
   a. the support member comprises a hollow housing having a circular sidewall;
   b. the manifold member is of annular shape and is supported within the housing against said sidewall;
   c. the inlet and outlet members project radially outward through said sidewall at circumferentially spaced intervals;
   d. the valve-actuating members are balls;
   e. the means supporting the valve-actuating members comprises a hollow cylinder disposed concentrically within the manifold member and has circumferentially spaced ball-confining openings therethrough; and
   f. the valve operator means comprises a cam member disposed within the hollow cylinder.